United States Patent
Folson

[11] 3,744,150
[45] July 10, 1973

[54] SOUND ILLUSTRATED BOOK
[75] Inventor: Henry J. Folson, Redondo Beach, Calif.
[73] Assignee: Mattel, Inc., Hawthorne, Calif.
[22] Filed: Jan. 3, 1972
[21] Appl. No.: 214,815

[52] U.S. Cl. .......... 35/8 A, 206/62 P, 206/DIG. 20, 274/42 P
[51] Int. Cl. ............................................. G09b 1/06
[58] Field of Search ......................... 35/8 A, 35 C; 274/42 P; 206/62 P, DIG. 20

[56] References Cited
UNITED STATES PATENTS

| | | |
|---|---|---|
| 2,524,143 | 10/1950 | Smith ............................. 35/8 A UX |
| 3,487,919 | 1/1970 | Elliott et al. .......... 206/DIG. 20 UX |
| 1,435,660 | 11/1922 | Rogerson ....................... 35/8 A UX |
| 2,109,627 | 3/1938 | Finch ............................. 35/8 A UX |

Primary Examiner—Wm. H. Grieb
Attorney—Seymour A. Scholnick

[57] ABSTRACT

Pictures are printed in a book in horizontal rows simulating rows of printed matter. A recorded message describes each picture in a predetermined sequence corresponding to a reading pattern from left-to-right and top-to-bottom of the page for developing habit patterns in a child-user which will pre-condition him to learn to read.

6 Claims, 3 Drawing Figures

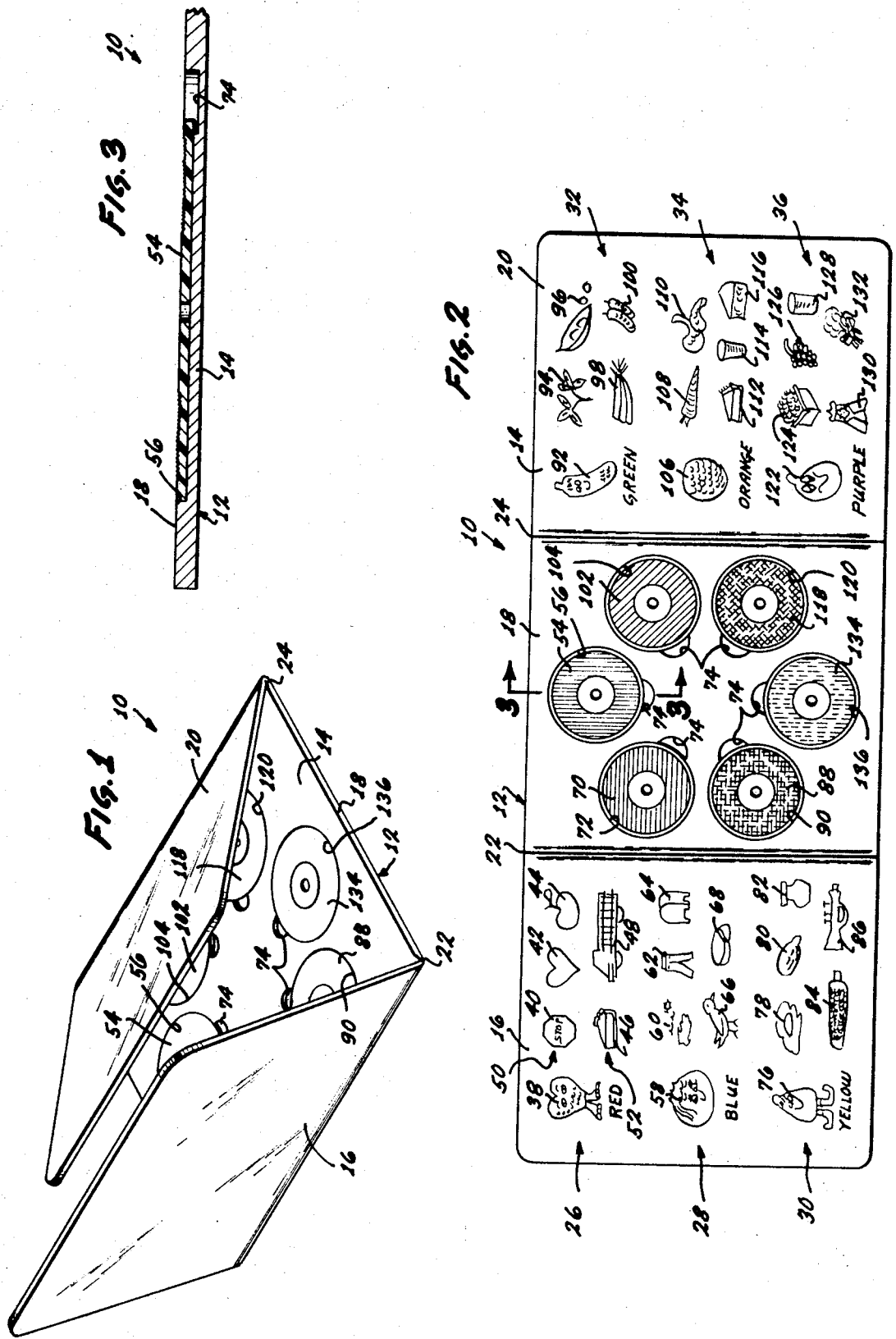

SOUND ILLUSTRATED BOOK

BACKGROUND OF THE INVENTION

The background of the invention will be set forth in two parts.

FIELD OF THE INVENTION

The present invention pertains generally to the field of sound illustrated books and more particularly to such a book which displays pictures in a predetermined sequence corresponding to a reading pattern and to a recorded message carrier having a recorded message describing each picture from left-to-right and top-to-bottom of each page of the book.

DESCRIPTION OF THE PRIOR ART

U.S. Pat. No. 2,945,307 exemplifies a number of prior art disclosures of the concept of associating pictures and recorded indicia including a correlation between printed pictures and corresponding sound tracks.

None of these prior art dislosures, on the other hand, discloses a specific arrangement of pictures in horizontal rows simulating printed matter in a book so that a recorded message may describe each picture in a predetermined sequence corresponding to a reading pattern from left-to-right and top-to-bottom on the page.

OBJECTS AND SUMMARY OF THE INVENTION

It is the primary object of the present invention to provide a new and useful sound illustrated book exemplifying improvements over the prior art.

Another object of the present invention is to provide a book of the type described constructed and arranged to develop reading patterns in pre-school children.

According to the present invention, a phonograph record and book combination is provided for developing reading patterns in pre-school children. The book has at least one page with at least one set of a plurality of pictures displayed thereon in at least two horizontal rows simulating rows of printed matter in a book.

A recorded message carrier is provided with a recorded message describing each picture in a predetermined sequence corresponding to a reading pattern from left-to-right and top-to-bottom of the page for developing habit patterns in a child-user which will pre-condition him to learn to read.

BRIEF DESCRIPTION OF THE DRAWING

FIG. 1 is a perspective view of a phonograph record and book combination of the present invention;

FIG. 2 is a plan view of the book of FIG. 1 in an open position; and

FIG. 3 is a partial, cross-sectional view taken along line 3—3 of FIG. 2.

DESCRIPTION OF THE PREFERRED EMBODIMENT

Referring again to the drawing, a sound illustrated book constituting a presently preferred embodiment of the invention, generally designated 10, includes a book 12 which is shown for purposes of illustration, but not of limitation, as being made from a single sheet of cardboard 14 divided into a first flap 16, a center section 18 and a second flap 20 by creases 22, 24, respectively.

The flaps 16, 20 represent pages of a book and each page is provided with three sets of pictures 26, 28, 30 and 32, 34, 36, respectively. All of the pictures in set 26 are red in color and are identified by a red caricature of a strawberry 38. The pictures in set 26 include a stop sign 40, a heart 42, an apple 44, a piece of cherry pie 46, and a fire truck 48. These pictures are displayed in two horizontal rows 50, 52 simulating rows of printed matter in a book.

A first recorded-message carrier 54 may be red in color and is mounted in a cavity 56 provided in center section 18 of book 12. Recorded-message carrier 54 is shown herein for purposes of illustration, but not of limitation, as comprising a disc record and it carries a recorded message describing each picture in set 26 in a predetermined sequence starting with stop sign 40 and corresponding to a reading pattern from left-to-right and top-to-bottom of the page represented by flap 16, whereby heart 42, apple 44, cherry pie 46 and fire truck 48 are described in that order. This develops habit patterns in a child-user which will pre-condition him to learn to read.

The pictures in set 28 may be identified by a caricature of a blueberry 58 and may include a blue sky 60, a pair of blue trousers 62, a blue mailbox 64, a blue bird 66, and a blue cap 68 which may be described in this sequence by a blue phonograph record 70. Record 70 may be carried in a cavity 72 provided in center section 18 of book 12 and may be removed therefrom by inserting a finger into a thumb-hole 74 and placed on a record player (not shown) for reproduction of the recorded message thereon.

Pictures in set 30 may be identified by a caricature of a yellow peach 76 and include a yellow egg yolk 78, a yellow squash 80, a yellow vase 82, a yellow ear of corn 84 and a yellow horn 86 which may be described in this sequence by a recorded message provided on a yellow record 88 stored in a cavity 90 provided in center section 18.

The individual pictures in set 32 may be identified by a caricature of a green pickle 92 and include green leaves 94, green peas 96, a green scarf 98 and a pair of green peppers 100 which may be described in this order by a suitable message recorded on a green phonograph record 102 stored in a cavity 104 provided in center section 18.

The pictures in set 34 are all orange in color, are identified by an orange 106 and include a carrot 108, a pair of gourds 110, a piece of pumpkin pie 112, a glass or orange juice 104 and a piece of cake 116 which may be described in this order by a message provided on an orange phonograph record 118 stored in a cavity 120 provided in center section 18.

The pictures in set 36 are all purple in color, are identified by a caricature of a purple grape 122 and include a box of berries 124, a bunch of grapes 126, a glass of grape juice 128, a gown 130 and flowers 132 which may be described in this order by a message recorded on a purple record 134 stored in a cavity 136 provided in center section 18.

Records 54, 70, 88 102, 118 and 134 may be removed from their cavities and played on a record player (not shown) in this order for teaching a child-user to read from left-to-right and top-to-bottom of each page starting with the page identified as flap 16.

Cavities 56, 90, 102, 120 and 136 are also provided with thumb-holes 74 to facilitate removal of the records.

Book 10 may be conveniently stored by folding flap 16, 20 over center section 18 to reduce the shelf space required for storing book 12.

While the particular sound illustrated book herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

What is claimed is:

1. A sound illustrated book, comprising:

a book having sets of a plurality of pictures displayed therein in at least two horizontal rows simulating rows of printed matter in a book;

a recorded-message carrier having a recorded message describing each picture in a predetermined sequence corresponding to a reading pattern from left-to-right and top-to-bottom of a set for developing habit patterns in a child-user which will precondition him to learn to read;

said book comprising a single sheet of cardboard divided into first and second flaps and a center section by creases, said first flap having three sets of pictures provided thereon, each of said sets being of a different color with all of the pictures in a particular set being of the same color;

a recorded-message carrier for each of said sets, each recorded message carrier being of the same color as its corresponding set; and cavities provided in said center section for storing said recorded message carriers.

2. A sound-illustrated book as stated in claim 1 wherein said second flap is also provided with three sets of pictures arranged in two horizontal rows simulating rows of printed matter in a book, each of said sets on said second flap being of a different color with all of the pictures in a particular set being of the same color and including a recorded-message carrier for each set on said second flap, each recorded-message carrier for each set on said second flap having a recorded message describing each picture in said predetermined sequence.

3. A sound-illustrated book as stated in claim 1 wherein said sets of pictures are identified by caricatures of a red strawberry, a blueberry and a yellow peach, respectively.

4. A sound-illustrated book as stated in claim 2 wherein said sets of pictures on said second flap are identified by caricatures of a green pickle, an orange and a purple grape, respectively.

5. A sound-illustrated book as stated in claim 3 wherein said recorded-message carriers are colored red, blue and yellow, respectively.

6. A sound-illustrated book as stated in claim 4 wherein said recorded-message carriers for said sets on said second flap are colored green, orange and purple, respectively.

* * * * *